(12) United States Patent
Pacher

(10) Patent No.: US 10,960,728 B2
(45) Date of Patent: Mar. 30, 2021

(54) FORK FOR AN OPERATING ELEMENT IN AN AIR OUTLET, OPERATING ELEMENT FOR AN AIR OUTLET, AND METHOD FOR FASTENING AN OPERATING ELEMENT

(71) Applicant: Illinois Tool Works Inc., Glenview, IL (US)

(72) Inventor: Thomas Pacher, Sembach (DE)

(73) Assignee: Illinois Tool Works Inc., Glenview, IL (US)

( * ) Notice: Subject to any disclaimer, the term of this patent is extended or adjusted under 35 U.S.C. 154(b) by 92 days.

(21) Appl. No.: 16/073,419

(22) PCT Filed: Jan. 27, 2017

(86) PCT No.: PCT/IB2017/000046
§ 371 (c)(1),
(2) Date: Jul. 27, 2018

(87) PCT Pub. No.: WO2017/130056
PCT Pub. Date: Aug. 3, 2017

(65) Prior Publication Data
US 2018/0354338 A1 Dec. 13, 2018

(30) Foreign Application Priority Data
Jan. 27, 2016 (DE) .......................... 102016101443.5

(51) Int. Cl.
*B60H 1/00* (2006.01)
*B60H 1/26* (2006.01)
*B60H 1/34* (2006.01)
*F24F 13/14* (2006.01)

(52) U.S. Cl.
CPC .......... *B60H 1/0065* (2013.01); *B60H 1/3421* (2013.01); *F24F 13/1426* (2013.01); *B60H 2001/3471* (2013.01); *B60H 2001/3478* (2013.01); *B60H 2001/3492* (2013.01)

(58) Field of Classification Search
CPC ................ B60H 1/0065; B60H 1/3421; B60H 2001/3471; B60H 2001/3492; F24F 31/1426
USPC ......................................................... 454/143
See application file for complete search history.

(56) References Cited

U.S. PATENT DOCUMENTS

2015/0328959 A1 11/2015 Suzuki et al.

FOREIGN PATENT DOCUMENTS

| JP | 3176607 U | 6/2012 |
| JP | 2012179932 A | 9/2012 |
| JP | 2013154769 A | 8/2013 |
| JP | 2014121943 A | 7/2014 |
| JP | 2016078557 A | 5/2016 |

*Primary Examiner* — Helena Kosanovic
(74) *Attorney, Agent, or Firm* — Quarles & Brady LLP

(57) ABSTRACT

A fork (10) for an operating element in an air outlet has a first bearing journal (14) at a first end (12) and a second bearing journal (18) at a second end (16). At least one spring arm (22, 24) is provided between the first bearing journal (14) and the second bearing journal (18), it being possible for the spacing of the outer ends (12, 16) of the bearing journals (14, 18) to be reduced by way of said at least one spring arm (22, 24). Furthermore, an operating element and a method for fastening an operating element are provided.

18 Claims, 3 Drawing Sheets

FORK FOR AN OPERATING ELEMENT IN AN AIR OUTLET, OPERATING ELEMENT FOR AN AIR OUTLET, AND METHOD FOR FASTENING AN OPERATING ELEMENT

RELATED APPLICATIONS

The present application is a National Stage of International Application No. PCT/IB2017/000046, filed on Jan. 27, 2017, and claims the benefit of German Patent Application No. 10 2016 101 443.5, filed on Jan. 27, 2016.

TECHNICAL FIELD

The invention relates to a fork for an operating element in an air outlet, in particular in motor vehicles, to an operating element for an air outlet, and to a method for fastening an operating element.

BACKGROUND

Various embodiments of operating elements for air outlets are known from the prior art. Said operating elements are frequently of multiple-piece design and have an operating part with a fork which serves to control the rear slat in the air outlet.

In the simplest embodiment, the fork is integrated rigidly into the operating part. In order to optimize the air guidance of the slats and on account of the restricted amount of available installation space, the fork is frequently mounted in a joint in the operating part. By way of adaptation of the diameters and/or the bearing spacings, the play between the fork and the operating part is minimized or generates a slight prestress, in order to achieve play-free smooth-running mounting of the fork. In addition, the operating part and the fork are usually of very stable configuration, in order for it to be possible to absorb high misuse forces during the operation.

After mounting, the fork and the operating part have no or only very low elasticity or prestress in the longitudinal and/or axial direction. The mechanical loading, above all of the fork, during mounting is not clearly defined or restricted by the construction. The mounting forces are high and are subject to great fluctuations. In addition, they lead to plastic deformation, above all of the fork, as a result of which the capability to absorb misuse forces is reduced and the function is disrupted as a result of the change in shape of the fork.

In order to minimize the forces and, as a result, the deformation during mounting, the overlaps in the bearing points are of small configuration. This leads structurally, however, to the forces which can be absorbed being reduced. Furthermore, the risk therefore rises of the fork being detached unintentionally from the operating part during operation, in particular in case of misuse.

Furthermore, the high mounting forces and the production tolerances lead to it being possible for the components to be moved freely with respect to one another directly after mounting without a force from the outside, and to the production of noise being promoted in the installed air outlet as a result. In addition, the construction loses further prestress after climate loading and/or continuous loading, as a result of post-shrinkage and/or setting behavior of the materials which are used, as a result of which the occurrence of disruptive noise is likewise promoted.

SUMMARY OF EMBODIMENTS OF THE DISCLOSURE

In an embodiment, a fork is provided for an operating element in an air outlet. The fork has a first bearing journal at a first end and a second bearing journal at a second end. At least one spring arm is provided between the first bearing journal and the second bearing journal, wherein a spacing extends between the first and second ends. The at least one spring arm is compressible to reduce the spacing between the first and second ends.

In some aspects, the at least one spring arm is configured to travel a distance when compressed that is approximately equal to a length of one of the bearing journals.

In some aspects, the fork also includes a control element. The at least one spring arm includes a first spring arm arranged between the control element and the first bearing journal and a second spring arm arranged between the control element and the second bearing journal. The first and second spring arms are configured to travel first and second distances, respectively, when compressed. The fork also includes stops of the first spring arm that limit the first distance and stops of the second spring arm that limit the second distance. The first distance is less than a length of the second bearing journal and the second distance is less than a length of the first bearing journal. A sum of the first and second distances is greater than the length of the first bearing journal or the length of the second bearing journal.

Optionally, the first and second distances of the first and the second spring arms, respectively, are equal.

In some aspects, the first bearing journal has a bearing diameter and the second bearing journal has a bearing diameter. The bearing diameters of the first and second bearing journals are different.

In some aspects, the fork is configured in one piece.

In an embodiment, an operating element for an air outlet is provided having the fork and an operating part. The operating part has a guide for a slat and at least first and second bearing points. The first bearing journal is mounted in the first bearing point and the second bearing journal is mounted in the second bearing point. A spacing between the first and second bearing points is approximately equal to the spacing between the first and second outer ends when the first and second spring arms are compressed to a maximum extent, minus the length of the first bearing journal or the length of the second bearing journal.

In some aspects, the operating part comprises a first side section and a second side section. At least one first and second side sections have a slot such that at least a part of said side section is configured to be deflected elastically.

In some aspects, the slot runs in said side section transversely with respect to a slat longitudinal direction and parallel to a slat plane.

In some aspects, the operating part is configured in one piece.

In some aspects, the fork is mounted without play in at least one of the bearing points by way of an elastic prestressing force.

In some aspects, at least one of the first and second bearing journals has a bearing axis that is arranged at an angle of greater than 0° with respect to a bearing axis of at least one of the first and second bearing points for mounting the fork without play.

In some aspects, at least one of the first and second bearing points has first and second bearing sections separated by a slot. The first and the second bearing sections apply a force to the fork for mounting the fork without play.

In an embodiment, an operating element for an air outlet having the fork and an operating part is provided. The operating part has a guide for a slat and at least first and second bearing points, wherein the first bearing journal is mounted in the first bearing point and the second bearing journal is mounted in the second bearing point. A spacing between the first and second bearing points is smaller than the spacing between the first and second outer ends when either the stops of the first spring arm engage one another or the stops of the second spring arm engage one another.

In an embodiment, a method for fastening an operating element on a slat is provided. The method includes pushing of the slat into the operating part and inserting of the fork into the operating part, wherein each of the first and second spring arms is compressed at the same time during the insertion of the fork into the operating part.

BRIEF DESCRIPTION OF THE DRAWINGS

Further advantages and features result from the following description in conjunction with the appended drawings, in which.

DETAILED DESCRIPTION OF EMBODIMENTS OF THE DISCLOSURE

Figure 1:
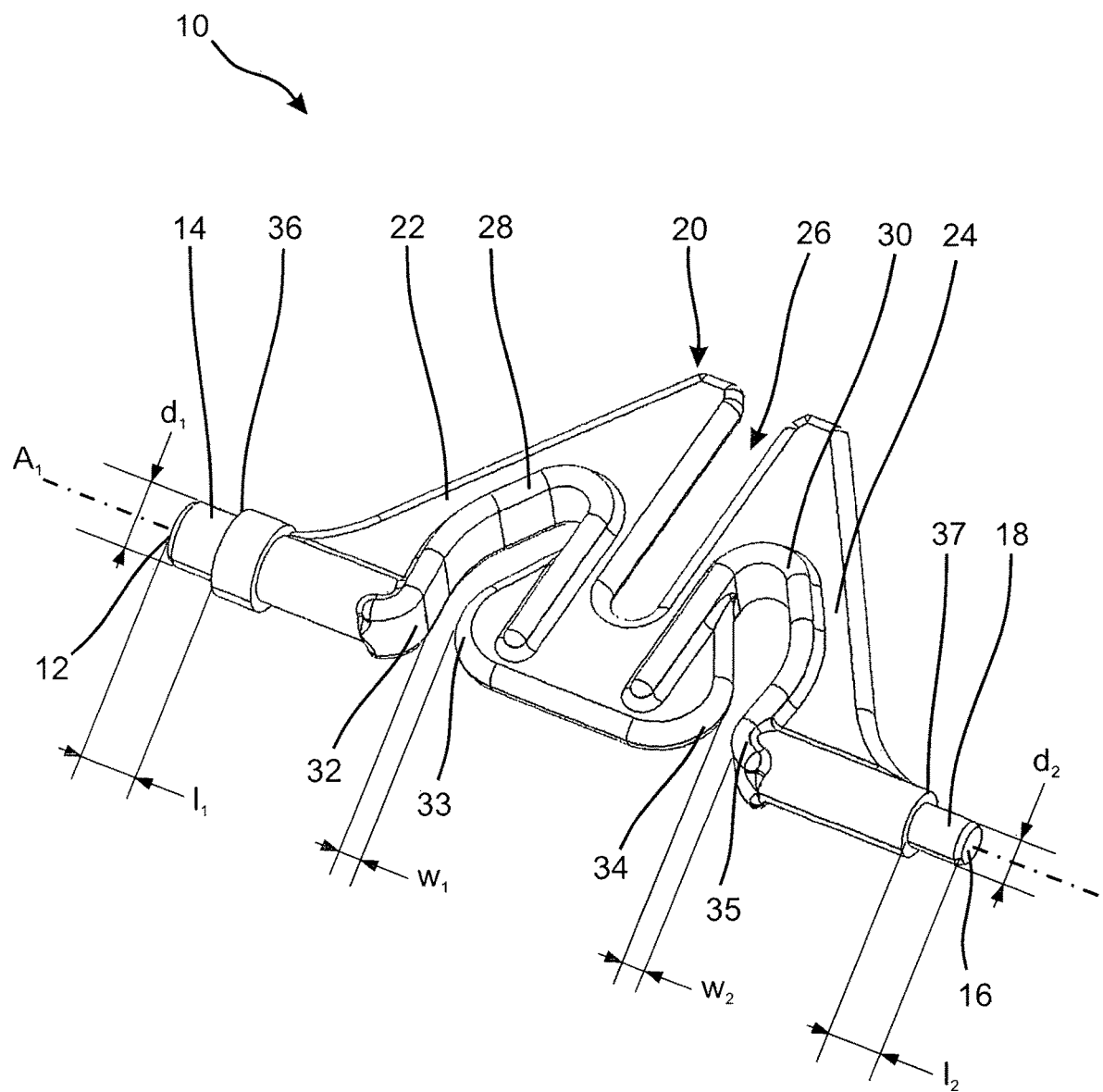
FIG. 1 shows a perspective view of a fork according to the invention.

It is therefore an object of the invention to provide a fork for an operating element, which fork can be mounted simply and reliably, undesired plastic deformation during mounting being prevented by the construction. Furthermore, even after climate loading and/or continuous loading, play-free mounting is to be ensured and therefore disruptive noise is to be prevented, and the fork is to be capable of absorbing high misuse forces both during use and during mounting. Furthermore, the fork is to have a robust design with low sensitivity to tolerances in the components and during mounting.

In order to achieve the object, a fork for an operating element in an air outlet is provided, which fork has a first bearing journal at a first end and a second bearing journal at a second end, at least one spring arm being provided between the first bearing journal and the second bearing journal, it being possible for the spacing of the outer ends of the bearing journals to be reduced by way of said at least one spring arm. The spring arm makes it possible to mount the fork simply and without undesired plastic deformation. Furthermore, the fork can be mounted without play in the operating element by way of the restoring force of the spring arm, as a result of which disruptive noise is avoided.

The overall spring travel of the at least one spring arm can correspond approximately to the length of one of the bearing journals, as a result of which the fork can be compressed to such an extent that the second bearing journal can be inserted into the second bearing point after the first bearing journal has already been inserted into the first bearing point. In this way, simple mounting without undesired plastic deformation is ensured.

The fork preferably has a control element, a first spring arm which is arranged between the control element and the first bearing journal, and a second spring arm which is arranged between the control element and the second bearing journal, and stops which limit the corresponding spring travels of the spring arms, the spring travel of the first spring arm being smaller than the length of the second bearing journal, and the spring travel of the second spring arm being smaller than the length of the first bearing journal. In addition, the overall spring travel of the first and the second spring arm is greater than the length of one of the bearing journals. By way of the spring arms, the fork has elements which specifically make the elastic deformation of the fork and therefore secure mounting of the latter possible. Here, the stops ensure structurally that the spring arms cannot be loaded beyond their elastic range. By the control element being arranged between the two spring arms and the bearing journal in each case being longer than the spring travel of the correspondingly opposed spring arm, undesired dismantling is prevented during use, since always only one spring arm is compressed during the operation of the operating element on account of the single-sided loading, whereas the compression of both spring arms is required for dismantling. Furthermore, the spring arms allow a prestressing force to be set in a targeted manner between the fork and the operating part, which prestressing force ensures play-free mounting of the fork in the operating part.

According to one preferred embodiment, the first and the second spring arm have the same spring travel and the same spring force. As a result of said symmetrical design of the spring arms, the forces which are required for operation are also symmetrical, as a result of which the operating comfort is increased. In addition, the mounting security can be improved in the case of a symmetrical design of the overall fork, since the fork can be installed in both orientations.

According to a further preferred embodiment, the bearing diameter of the first bearing journal differs from the bearing diameter of the second bearing journal. Since a clear distinction of the orientation of the fork is possible as a result, the mounting security is increased in this way. This is advantageous, in particular, when a certain orientation of the fork is required for the correct function of the operating element, and the shape of the corresponding bearing points additionally prevents faulty mounting.

The fork is preferably configured in one piece, in particular from a plastic. A fork of this type has the advantage that it can be produced inexpensively and mounted simply.

According to the invention, in order to achieve the above-mentioned object, an operating element for an air outlet with a fork according to the invention and an operating part is also provided, which has a guide for a slat and at least two bearing points, the first bearing journal being mounted in a first bearing point and the second bearing journal being mounted in a second bearing point, the spacing of the bearing points corresponding approximately to the spacing of the outer ends of the bearing journals when all spring arms are compressed to a maximum extent, minus the length of one of the bearing journals. As a result, the fork can be mounted without undesired plastic deformation, since the spacing of the bearing points is sufficient to insert the second bearing journal into the second bearing point when the first bearing journal has already been inserted into the first bearing point.

In order to achieve the abovementioned object, furthermore, an operating element for an air outlet with a fork according to the invention and an operating part is provided, which has a guide for a slat and at least two bearing points. Here, the first bearing journal is mounted in a first bearing point and the second bearing journal is mounted in a second bearing point, the spacing of the bearing points being smaller than the spacing of the outer ends of the bearing journals when the stops either of the first or the second spring arm bear against one another. It is ensured in this way that the spacing of the bearing points is so great that the fork can be installed without plastic deformation. At the same time, the maximum spacing of the bearing points ensures that the fork is fastened in the operating part even when the fork is deformed in such a way that the stops of a spring arm bear against one another.

According to one advantageous embodiment, the operating part comprises a first and a second side section, at least one side section having a slot on one side, with the result that at least one part of the side section can be deflected elastically. This has the advantage that the deformation of the fork during mounting can be minimized, by it being possible for the side sections with a slot to be deflected and thus for the corresponding bearing journals to be positioned in the bearing point without deformation of the fork. In addition, the operating part can be designed in such a way that the side section or sections with a slot applies/apply a prestressing force to the slat, as a result of which a displacement resistance can be defined which increases the operating comfort.

The slot preferably runs in the side section transversely with respect to the slat longitudinal direction and parallel to the slat plane, since the mounting of the fork is facilitated as a result and, at the same time, reliable guidance of the slat is ensured.

The operating part is preferably configured in one piece from a plastic, as a result of which it can be produced inexpensively and can have advantageous elastic properties in the case of a suitable selection of the plastic.

According to a further advantageous embodiment, the fork is mounted without play in at least one of the bearing points by way of an elastic prestressing force. In this way, an undesired relative movement of the fork with respect to the operating part and therefore the occurrence of disruptive noise are avoided.

The bearing axis of at least one of the bearing journals is preferably arranged at an angle of greater than 0° with respect to the bearing axis of at least one of the bearing points, the fork being mounted without play as a result. Elastic prestressing forces which ensure low-noise mounting of the fork act as a result of the oblique arrangement of the bearing axis in the bearing point.

In one preferred embodiment, at least one of the bearing points with a slot has a first and a second bearing section, the first and the second bearing section applying a force to the fork, with the result that the fork is mounted without play. In this way, the two bearing sections ensure that the fork cannot cause any disruptive noise.

In order to achieve the abovementioned object, furthermore, a method for fastening an operating element according to the invention on a slat is provided, having the steps:
  pushing of the slat into the operating part, and
  inserting of the fork into the operating part,
  all spring arms being compressed at the same time during the insertion of the fork into the operating part.

FIG. 1 shows a fork 10 according to the invention which has a first bearing journal 14 at a first end 12 and a second bearing journal 18 at a second end 16.

A control element 20, a first spring arm 22 and a second spring arm 24 are arranged between the first and the second bearing journal 14, 18. The first spring arm 22 is arranged between the first bearing journal 14 and the control element 20, whereas the second spring arm 24 is arranged between the second bearing journal 18 and the control element 20.

The control element 20 comprises a recess 26, by way of which further elements in the air outlet can be actuated.

The fork 10 is of M-shaped design, the shape being formed by way of the U-shaped control element 20 and the first and second spring arm 22, 24.

In each case one bead 28, 30 is provided on the inner side of the spring arms 22, 24, which bead 28, 30 serves to reinforce the corresponding spring arm 22, 24 and by way of which the spring force of the respective spring arm 22, 24 can be set structurally.

The first spring arm 22 has a spring travel w1 and the second spring arm 24 has a spring travel w2. The spring travels w1, w2 and the spring forces of the spring arms 22, 24 can in each case be of identical length or size or, as an alternative, can also be of different length or size.

The spring arms 22, 24 have stops 32, 33, 34, 35 which limit the spring travel w1, w2 of the corresponding spring arm 22, 24. By way of the stops 32, 33, 34, 35, the spring travels w1, w2 are limited to the elastic range of the spring arms 22, 24 during the compression of the spring arms 22, 24. In this way, plastic deformation of the fork 10 is avoided.

The first bearing journal 14 has a length l1 and a bearing journal diameter d1, whereas the second bearing journal 18 has a length l2 and a bearing journal diameter d2. The bearing journal diameters d1, d2 and the lengths l1, l2 of the two bearing journals 14, 18 can be designed so as to be in each case of identical length or size or, as an alternative, also of different length or size.

The length l1 of the first bearing journal 14 is greater than the spring travel w2 of the second spring arm 24, and the length l2 of the second bearing journal 18 is greater than the spring travel w1 of the first spring arm 22. Here, the overall spring travel w1+w2 is greater than at least one of the lengths l1, l2 of the bearing journals 14, 18.

In each case one stop element 36, 37 is arranged on the first bearing journal 14 in an opposed manner with respect to the first end 12 and on the second bearing journal 18 in an opposed manner with respect to the second end 16. The stop elements 36, 37 have a greater diameter at least in sections than the corresponding bearing journal diameters d1, d2 and are provided for limiting the penetration depth and axial mounting of the bearing journals 14, 18.

The first bearing journal 14 and the second bearing journal 18 have a bearing axis A1. In one alternative embodiment, the bearing axes of the bearing journals 14, 18 are not identical and, in particular, are not parallel.

The fork 10 is of single-piece design and preferably consists of an elastic plastic.

The spring arms 22, 24 which are shown in FIG. 1 are merely one possible embodiment which is not to be understood as restrictive, however, for the design of the spring arms 22, 24. The spring arms 22, 24 can be designed as spring elements with any desired shape which a person skilled in the art considers to be suitable within the context of the invention.

Figure 2:
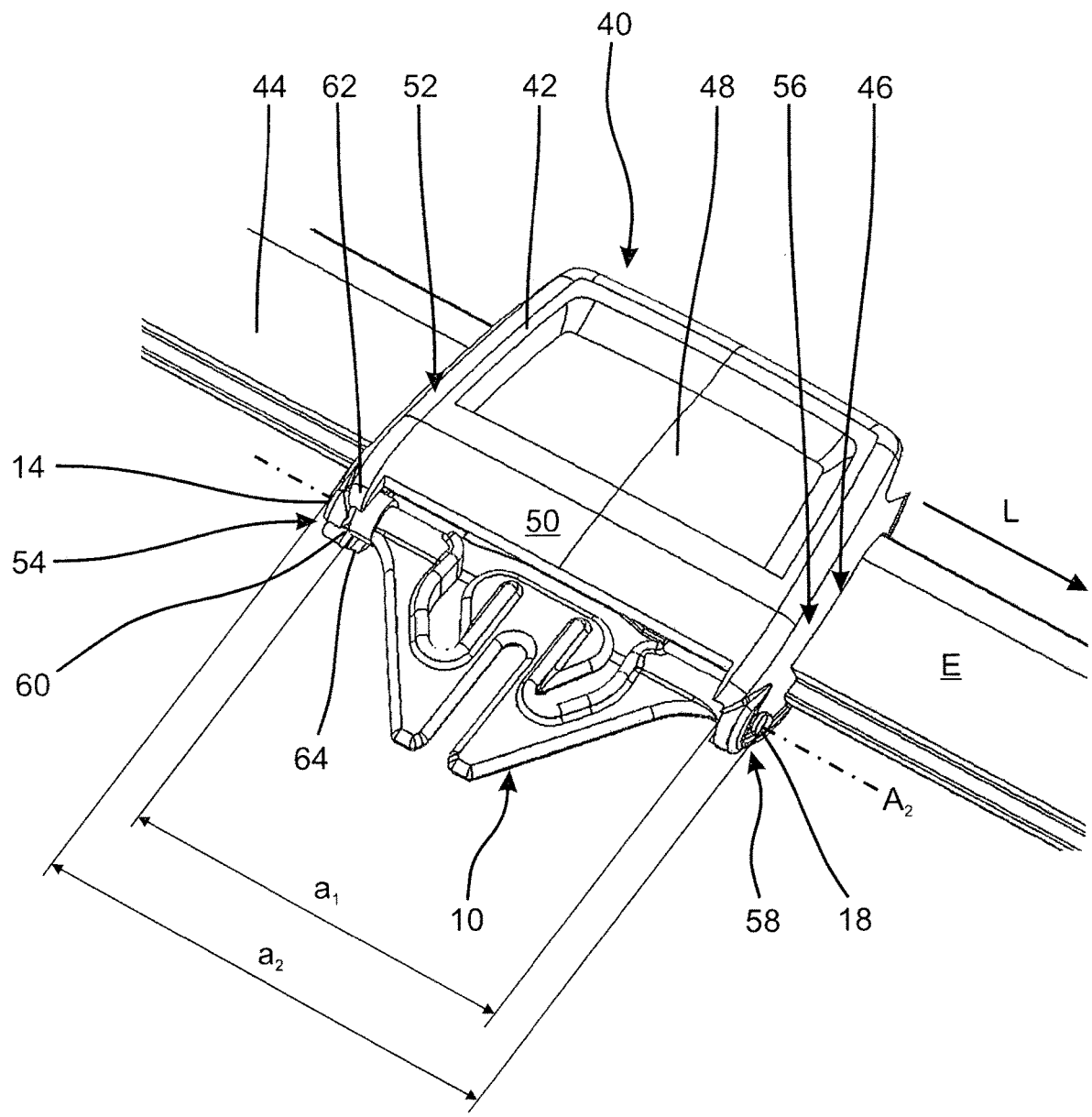
FIG. 2 shows a perspective view of an operating element according to the invention with the fork from FIG. 1.

FIG. 2 shows an operating element 40 according to the invention which comprises an operating part 42 with a fork 10 and is mounted on a slat 44.

The operating element 40 is provided for the operation of an air outlet and can be configured in one piece from a plastic.

The operating part 42 has a guide 46 which runs parallel to the slat plane E and in the slat longitudinal direction L and in which the slat 44 is arranged.

The operating part 42 has a substantially cuboid basic shape with a depression 48 on a side face 50 which is parallel to the slat plane E. The depression 48 facilitates the operation of the operating element 40 and, as an alternative, can also be provided on both sides and/or in another configuration, for example as a grooved surface.

Furthermore, the operating part 42 comprises a first side section 52 with a first bearing point 54 and a second side section 56 which is arranged opposite the first side section 52 with a second bearing point 58. The fork 10 is mounted with its first bearing journal 14 in the first bearing point 54 and with its second bearing journal 18 in the second bearing point 58.

Here, the spacing a1 from the first bearing point 54 to the second bearing point 58 is smaller than the spacing a2 of the outer ends 12, 16 (see FIG. 1) of the first and second bearing journals 14, 18, even if the stops 32, 33, 34, 35 of one of the spring arms 22, 24 bear against one another. It is ensured in this way that the control element 20 is not released from the operating part 42 during use of the operating element 40, since the control element 20 is loaded only on one side during use and therefore only one spring arm 22, 24 of the fork 10 is compressed.

The first side section 52 has a slot 60 which separates a first bearing section 62 from a second bearing section 64.

The slot 60 runs transversely with respect to the slat longitudinal direction L and parallel to the slat plane E.

A part of the side section 52 can be deflected elastically by way of the slot 60. This property is useful, in particular, during the fastening of the operating part 42 on the slat 44.

The operating part 42 has an elastic prestressing force perpendicularly with respect to the slat plane E, by way of which elastic prestressing force the bearing sections 62, 64 mount the fork 10 without play.

In one alternative embodiment, the fork 10 is mounted without play in the operating part 42, by the bearing axis A1 of at least one bearing journal 14, 18 being arranged at an angle of greater than 0°, that is to say not parallel, with respect to the bearing axis A2 of at least one of the bearing points 54, 58.

As an alternative, the play-free mounting of the fork 10 in the operating part 42 by way of an elastic prestressing force can also be provided in another way, for example by way of an interference fit of the bearing journals 14, 18 in the corresponding bearing points 54, 58.

In order to mount the operating element 40 on the slat 44, the slat 44 is pushed into the guide 46 of the operating part 42 in a first step. Subsequently, the fork 10 is fastened in the operating part 42 in a second step, by a bearing journal 14, 18 first of all being inserted into a corresponding bearing point 54, 58, and subsequently, with simultaneous compression of all spring arms 22, 24, the other bearing journal 14, 18 first of all being oriented on the other bearing point 54, 58 and finally being inserted into said bearing point 54, 58 by way of relieving of the spring arms 22, 24.

In one embodiment, in which the operating part 42 has a slot 60 on both side sections 52, 56, the operating part 42 can also be pushed laterally onto the slat 44.

In this method, the spring arms 22, 24 which are provided to this end are merely deformed elastically, as a result of which it is ensured that the fork 10 is not deformed plastically during mounting. In this way, play-free mounting of the fork 10 is ensured and therefore disruptive noise is avoided.

Figure 3:
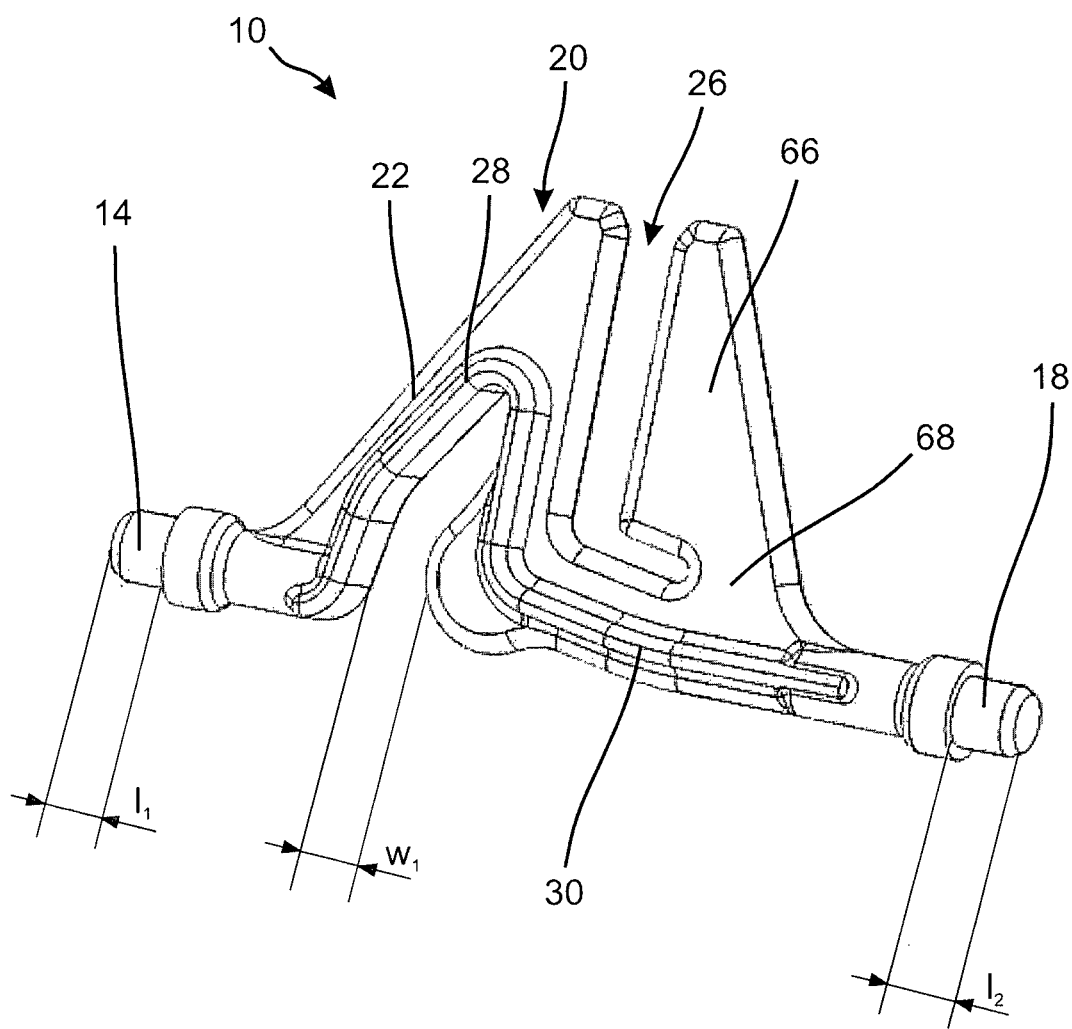
FIG. 3 shows a perspective view of a further embodiment of a fork according to the invention.

FIG. 3 shows a further embodiment of a fork 10 according to the invention with only one spring arm 22.

The side with the spring arm 22 is of analogous design to the fork from FIG. 1. The control element 20 has a vane 66 on the side, on which no spring arm 22, 24 is provided.

Here, the recess 26 in the control element 20 is of L-shaped design and protrudes into the vane 66, as a result of which the vane 66 can be deflected elastically about the attachment 68 and in this way can additionally absorb part of the misuse forces.

The bead 28 on the side with a spring arm 22 merges without a transition into the bead 30 on the side without a spring arm 22, 24, and increases the stability of the fork 10.

In said embodiment, the spring travel w1 of the fork 10 corresponds approximately to the length l1, l2 of one of the bearing journals 14, 18.

The invention claimed is:

1. A fork for an operating element and a slat in an air outlet, the slat defining a slate plane, the fork comprising:
   a first bearing journal at a first end;
   a second bearing journal at a second, the first and second bearing journals defining a bearing axis; and
   at least one spring arm provided between the first bearing journal and the second bearing journal, the at least one spring arm having a first surface and an opposing second surface,
   wherein a spacing extends between the first and second ends, the at least one spring arm being compressible to reduce the spacing between the first and second ends,
   wherein the bearing axis defines a reference plane that bisects the at least one spring arm, and
   wherein a bead is provided along the at least one spring arm, the bead extending away from the reference plane farther than the spring arm so that a thickness of the bead is greater than a thickness of the at least one spring arm measured perpendicular to the reference plane.

2. The fork of claim 1, wherein the at least one spring arm is configured to travel a distance when compressed that is approximately equal to a length of one of the bearing journals.

3. The fork of claim 1, further comprising:
   a control element, wherein the at least one spring arm includes a first spring arm arranged between the control element and the first bearing journal and a second spring arm arranged between the control element and the second bearing journal, the first and second spring arms configured to travel first and second distances, respectively, when compressed; and
   stops of the first spring arm that limit the first distance and stops of the second spring arm that limit the second distance, wherein the first distance is less than a length of the second bearing journal and the second distance is less than a length of the first bearing journal, wherein a sum of the first and second distances is greater than the length of the first bearing journal or the length of the second bearing journal.

4. The fork of claim 3, wherein the first and second distances of the first and the second spring arms, respectively, are equal.

5. The fork of claim 1, wherein the first bearing journal has a bearing diameter and the second bearing journal has a bearing diameter, the bearing diameters of the first and second bearing journals being different.

6. The fork of claim 1, wherein the fork is configured in one piece.

7. An operating element for an air outlet having the fork of claim 1 and an operating part which has a guide for a slat and at least first and second bearing points, wherein the first bearing journal is mounted in the first bearing point and the second bearing journal is mounted in the second bearing point, wherein a spacing between the first and second bearing points is approximately equal to the spacing between the first and second outer ends when the first and second spring arms are compressed to a maximum extent, minus the length of the first bearing journal or the length of the second bearing journal.

8. The operating element of claim 7, wherein the operating part comprises a first side section and a second side section, at least one first and second side sections having a slot such that at least a part of said side section is configured to be deflected elastically.

9. The operating element of claim 8, wherein the slot runs in said side section transversely with respect to a slat longitudinal direction and parallel to a slat plane.

10. The operating element of claim 7, wherein the operating part is configured in one piece.

11. The operating element of claim 7, wherein the fork is mounted without play in at least one of the bearing points by way of an elastic prestressing force.

12. The operating element of claim 7, wherein at least one of the first and second bearing points has first and second bearing sections separated by a slot, the first and the second bearing sections applying a force to the fork for mounting the fork without play.

13. An operating element for an air outlet having a fork as claimed in claim 3 and an operating part which has a guide for a slat and at least first and second bearing points, wherein the first bearing journal is mounted in the first bearing point and the second bearing journal is mounted in the second bearing point, wherein a spacing between the first and second bearing points is smaller than the spacing between the first and second outer ends when either the stops of the first spring arm engage one another or the stops of the second spring arm engage one another.

14. The operating element of claim 13, wherein the operating part comprises a first side section and a second side section, at least one first and second side sections having a slot such that at least a part of said side section is configured to be deflected elastically.

15. The operating element of claim 14, wherein the slot runs in said side section transversely with respect to a slat longitudinal direction and parallel to a slat plane.

16. The operating element of claim 13, wherein at least one of the first and second bearing points has first and second bearing sections separated by a slot, the first and the second bearing sections applying a force to the fork for mounting the fork without play.

17. A method for fastening an operating element as claimed in claim 7 on a slat, the method comprising:
a) pushing of the slat into the operating part, and
b) inserting of the fork into the operating part,
wherein each of the first and second spring arms is compressed at the same time during the insertion of the fork into the operating part.

18. The fork of claim 1, wherein the at least one spring arm includes a first spring arm arranged adjacent the first bearing journal and a second spring arm arranged adjacent the second bearing journal, the first and second spring arms being compressible to reduce the spacing between the first and second ends, and wherein the bead is provided on inner sides of the first and second spring arms.

* * * * *